Patented Jan. 26, 1937

2,068,742

UNITED STATES PATENT OFFICE 2,068,742

INSECTICIDE

Charles B. Gnadinger, Minneapolis, Minn.

No Drawing. Application January 6, 1933,
Serial No. 650,505

20 Claims. (Cl. 167—14)

This invention relates to the production of substances for killing insects, including red spiders and their eggs, and has been found to be particularly efficient in exterminating those red spiders and their eggs which are found on citrus plants. The invention, therefore, has among its objects, to provide substances which, although well adapted for general use, are particularly adapted for use on citrus plants, delicate plants of various kinds, outdoors or indoors, and which are adapted to kill red spiders and eggs without damage to the plant, whatever the stage of growth of the plant or spider.

In the invention of my copending application, Serial Number 587,147 for Insecticides, filed January 16, 1932, I disclose, among other things, that new and very efficient insecticides can be produced by using selenium dissolved in alkaline sulphide solutions. I also disclosed in the aforesaid application, new insecticidal substances formed by chemically combining an alkali, sulphur, and selenium.

In that application the sulphides used were mono-sulphides, such as $K_2S$, $Na_2S$, $KNH_4S$. As a result of extended investigations, including many experiments, I have now discovered that the polysulphides, such as $K_2S_2$, $K_2S_3$, $K_2S_4$, $K_2S_5$, $BaS_2$, $BaS_3$, $BaS_4$, $BaS_5$ do, when combined with selenium, form insecticides which are particularly efficient for killing red spiders, and, in fact, it now seems clear that all complex polyselenides of the alkali or alkaline earth metals are particularly efficient for this purpose.

The present invention, therefore, relates to new insecticidal materials made by combining selenium with any polysulphide of calcium, sodium or potassium, etc., or with any soluble polysulphide.

To understand the invention, some discussion of the chemical structure of sulphides in general seems advisable.

(1) The hydro-sulphides $KHS$, $NaHS$, $Ba(HS)_2$ $Ca(HS)_2$ are formed by saturating the alkali solution $KOH$ $Ba(OH)_2$ etc. with hydrogen sulphide.

(2) The sulphides $K_2S$, $Na_2S$, $BaS$, $CaS$, etc., are formed by saturating the alkali solution with hydrogen sulphide as in (1) and then adding an equivalent amount of alkali solution.

The equation for (1) may be $Ba(OH)_2+2H_2S=Ba(HS)_2+2H_2O$ and the equation for (2) may be $Ba(HS)_2+Ba(OH)_2=2BaS+2H_2O$.

(3) The polysulphides $K_2S_2$, $K_2S_3$, $K_2S_4$, $K_2S_5$, etc., and $BaS_2$, $BaS_3$, $BaS_4$, $BaS_5$, etc., can be made by dissolving sulphur in the mono-sulphides, or by heating alkaline solution with sulphur. The reactions may be represented as follows:

(A) $BaS+S=BaS_2$, or $K_2S+S=K_2S_2$; or
(B) $BaS+4S=BaS_5$, or $K_2S+4S=K_2S_5$; or
(C) $6KOH+12S=2K_2S_5+K_2S_2O_3+3H_2O$; or
(D) $3Ba(OH)_2+12S=2BaS_5+BaS_2O_3+3H_2O$; or
(E) $3Ca(OH)_2+12S=2CaS_5+CaS_2O_3+3H_2O$.

This latter product is "lime sulphur" of commerce. Most of the $BaS_2O_3$ or $CaS_2O_3$ is insoluble and is precipitated.

I claim herein, in addition to other matters, selenides of the type equivalent to the polysulphides (3) above. The following are examples:

$6KOH+3Se=K_2SeO_3+2K_2Se+3H_2O$; or
$3Ba(OH)_2+3Se=BaSeO_3+2BaSe+3H_2O$.

I do not wish to be limited to these examples, but claim as insecticides the polyselenides as a class whether formed as above, or formed by some other re-action, and I wish to include polyselenides of the alkali and alkaline earth metals.

It is intended to include complex selenides made by dissolving selenium in the polysulphides, for example:

$K_2S_2+Se$; or $BaS_5+Se$, etc., and to include any solution of selenium in a polysulphide solution. I, therefore, claim herein selenides of the type equivalent to the polysulphides in (3) above.

An excellent and very toxic insecticide is made by making a solution of three ounces of selenium in one gallon of calcium polysulphide solution. This is used at a dilution of one gallon to five hundred gallons of water, or one-fifth of one per cent. This is very effective against citrus red spiders at this dilution, whereas lime sulphur at this dilution is not effective. Commercial lime sulphur alone is used at much higher concentration, the minimum for red spiders being about one and one-half per cent or one gallon to sixty-six gallons of water, and even at this concentration it is not entirely effective.

Although selenium polysulphides of alkali and alkaline earth metals are claimed herein, I have further discovered that by using oil with any of the substances disclosed in the aforesaid copending application, a greater kill of red spiders at less concentration of both substances can be obtained. I, therefore, claim herein substances for the control of red spiders on plants, which include soluble, as well as insoluble, seleno-sulphides, and also seleno-polysulphides, in combination with oil, preferably mineral oil.

A good combination of "oil spray" with a "selenium spray" is prepared as follows: Dissolve three ounces of selenium in one gallon of commercial lime sulphur (calcium polysulphide). Make a tank mix oil spray emulsifying a suitable spray oil with blood albumen, calcium caseinate or other emulsifier, or use any suitable commercial emulsified oil. The proportion of oil in the spray should be about one-third of a gallon of oil to one hundred gallons of the spray, or one-third of one per cent. To the one hundred gallons of this oil spray add one gallon of lime sulphur selenium solution. I wish to cover herein the addition of from one-sixth to one-eighth of a gallon of polyselenide solution to one hundred gallons of water containing about one-third of a gallon of emulsified mineral oil.

A very effective spray giving practically one hundred per cent kill of spiders and eggs is made by adding one-sixth of a gallon potassium ammonium seleno-sulphide solution (disclosed in my copending application) to one-third of a gallon of emulsified oil in one hundred gallons of water. This spray is as effective as oil at one and one-half per cent, or as lime sulphur at two per cent concentration, and has no bad effect on citrus or other trees, whereas either lime sulphur or oil at the concentration necessary to use to kill red spiders and their eggs frequently causes severe damage to the trees.

This oil combination is an important feature. It is well known that a minimum of one and one-third per cent of oil is necessary to control red spiders, whereas I have found it necessary to use a maximum of only one-third of one per cent of oil. This is commercially important, because oil at one and one-half per cent concentration cannot be used under all climatic conditions, nor can it be used at certain seasons of the year, because of injury to citrus trees. My selenium oil spray can be applied under any condition of weather or growth, without injury to the tree, fruit, blossoms, buds, etc. The spray is very effective giving substantially one hundred per cent kill of spiders and eggs.

Moreover, the oil in combination with the substances of my above mentioned copending application is very effective for the purpose herein.

Again it is noted that the high toxic effects of the complex selenium polysulphides of this invention when mixed with oil prepared as above mentioned seems to result in a modification of both selenium polysulphide and oil which amounts to something more than mere addition, and which is, in effect, a multiplication of toxic effect not obtainable by either one alone, unless each is used in relatively high concentration.

Insofar as I am aware, no one has ever discovered that solutions of the polysulphides with selenium have such a powerful toxic effect on red spiders and their eggs, without injury to the plant at any stage of its growth.

I claim as my invention:

1. A process for producing an insecticide which consists in adding three ounces of selenium to one gallon of calcium polysulphide solution.

2. A process for producing an insecticide which consists in dissolving three ounces of selenium in one gallon of a polysulphide of an alkali metal and adding a suitably emulsified oil in an amount within a range of one-eighth to one-third of a gallon.

3. The process for forming an insecticide which consists in dissolving selenium in commercial lime sulphur, emulsifying a spray oil with blood albumen and adding one-third of a gallon of this oil which has been emulsified and one-sixth of a gallon of the lime sulphur selenium solution to one hundred gallons of water.

4. The process for forming an insecticide which consists in dissolving three ounces of selenium in one gallon of commercial lime sulphur, emulsifying a spray oil and adding one-third of a gallon of this emulsified oil and one-sixth of a gallon of the lime sulphur selenium solution, to one hundred gallons of water.

5. The process for forming an insecticide which consists in dissolving selenium in commercial lime sulphur, emulsifying a spray oil, and adding one-third of a gallon of this emulsified oil to one-sixth of a gallon of lime sulphur selenium solution.

6. The process for forming an insecticide which consists in dissolving three ounces of selenium in one gallon of commercial lime sulphur, emulsifying a spray oil with calcium caseinate and adding one-third of a gallon of this emulsified oil to one-sixth of a gallon of the lime sulphur selenium solution, then adding one hundred gallons of water.

7. The process for forming an insecticide which consists in dissolving three ounces of selenium in one gallon of commercial lime sulphur and diluting with five hundred gallons of water.

8. The process for forming an insecticide which consists in dissolving selenium in commercial lime sulphur, emulsifying a spray oil and adding one-third of a gallon of this oil, and from one-sixth to one-eighth of a gallon of the lime sulphur selenium solution to one hundred gallons of water.

9. An insecticide consisting of a selenosulphide of an alkali metal in a mineral oil.

10. An insecticide consisting of a selenopolysulphide of an alkaline earth metal in mineral oil.

11. A process for making an insecticide consisting in dissolving sulphur in a monosulphide of a metal selected from the group consisting of calcium, barium, sodium and potassium, and adding selenium.

12. An insecticide containing a seleno-polysulphide of an alkali metal.

13. An insecticide containing a seleno-polysulphide of a metal selected from the group consisting of sodium, potassium, calcium and barium.

14. An insecticide containing a seleno-polysulphide of a metal selected from the group consisting of sodium, potassium and calcium and barium, in oil.

15. An insecticide containing a seleno-polysulphide of an alkali metal in oil.

16. An insecticide containing a seleno-polysulphide of an alkaline earth metal.

17. An insecticide containing a seleno-polysulphide of sodium.

18. An insecticide containing a seleno-polysulphide of potassium.

19. An insecticide containing a seleno-polysulphide of calcium.

20. An insecticide containing a seleno-polysulphide of a metal selected from the group consisting of sodium, potassium, calcium and barium in oil in an amount less than one and one-third per cent.

CHARLES B. GNADINGER.